(12) United States Patent
Scavino et al.

(10) Patent No.: US 9,588,276 B2
(45) Date of Patent: Mar. 7, 2017

(54) LIGHT GUIDE DEVICE FOR ILLUMINATION

(71) Applicant: DENSO Thermal Systems S.p.A., Poirino (Turin) (IT)

(72) Inventors: Gianni Scavino, Poirino (IT); Paolo Gigliotti, Poirino (IT)

(73) Assignee: Denso Thermal Systems S.P.A., Poirino (Turin) (IT)

( * ) Notice: Subject to any disclaimer, the term of this patent is extended or adjusted under 35 U.S.C. 154(b) by 0 days.

(21) Appl. No.: 14/781,012

(22) PCT Filed: Mar. 28, 2014

(86) PCT No.: PCT/IB2014/060256
§ 371 (c)(1),
(2) Date: Sep. 28, 2015

(87) PCT Pub. No.: WO2014/155350
PCT Pub. Date: Oct. 2, 2014

(65) Prior Publication Data
US 2016/0054505 A1 Feb. 25, 2016

(30) Foreign Application Priority Data
Mar. 29, 2013 (IT) .............................. TO2013A0261

(51) Int. Cl.
*F21V 8/00* (2006.01)
*B60K 37/02* (2006.01)
(Continued)

(52) U.S. Cl.
CPC ............ *G02B 6/0028* (2013.01); *B60K 37/02* (2013.01); *B60Q 3/004* (2013.01); *B60Q 3/044* (2013.01);
(Continued)

(58) Field of Classification Search
CPC .. G02B 6/0008; G02B 6/0018; G02B 6/0028; G02B 6/0031; G02B 6/0088;
(Continued)

(56) References Cited

U.S. PATENT DOCUMENTS 4,767,172 A 8/1988 Nichols et al.
7,422,357 B1 9/2008 Chang
(Continued)

FOREIGN PATENT DOCUMENTS

DE 3244710 A1 6/1984
DE 19538547 A1 4/1997
(Continued)

OTHER PUBLICATIONS

International Search Report and Written Opinion dated Aug. 12, 2014 for Application No. PCT/IB2014/060256.

*Primary Examiner* — Thomas M Sember
(74) *Attorney, Agent, or Firm* — Patterson & Sheridan, LLP

(57) ABSTRACT

A light guide device, comprising a light entrance part for receiving luminous radiation from a light source placed in front of it, and a light exit part configured for emitting the luminous radiation according to a distributed illumination pattern. The device includes: a first light guide member comprising a central light transmitting portion, on an end of which the light entrance part is formed, and a support portion connected to the central light transmitting portion and arranged concentrically therewith, and—a second light guide member comprising a shaft portion removably coupled to an end of the central light transmitting portion of the first light guide member, opposite to the light entrance part, and a light distributing portion connected to the shaft portion, on which the light exit part is formed.

18 Claims, 4 Drawing Sheets

(51) Int. Cl.
*G01D 11/28* (2006.01)
*B60Q 3/00* (2006.01)
*B60Q 3/04* (2006.01)

(52) U.S. Cl.
CPC ........... *G01D 11/28* (2013.01); *G02B 6/0031* (2013.01); *G02B 6/0088* (2013.01); *G02B 6/0008* (2013.01); *G02B 6/0018* (2013.01)

(58) Field of Classification Search
CPC ........ B60K 37/02; G01D 11/28; B60Q 3/004; B60Q 3/044
See application file for complete search history.

(56) References Cited

U.S. PATENT DOCUMENTS

| | | |
|---|---|---|
| 2003/0179581 A1 | 9/2003 | Swarovski |
| 2004/0089219 A1 | 5/2004 | Burau et al. |
| 2004/0264185 A1 | 12/2004 | Grotsch et al. |
| 2008/0123349 A1 | 5/2008 | Chaves et al. |
| 2008/0264328 A1 | 10/2008 | Birman et al. |

FOREIGN PATENT DOCUMENTS

| | | |
|---|---|---|
| EP | 1750054 A1 | 2/2007 |
| GB | 1378889 A | 12/1974 |
| GB | 2261061 A | 5/1993 |
| GB | 2372091 A | 8/2002 |

LIGHT GUIDE DEVICE FOR ILLUMINATION

The present invention relates to a light guide device for guiding the light incident on a light entrance part in such a way that the light is emitted by a light exit part, and to an illumination unit in which the aforementioned light guide device is installed.

For the retroillumination of a control device on an instrument panel of a motor vehicle, it is known to use light guides which transmit the light emitted by a light source towards a dial section, for example a scale arranged in a circular manner around a knob.

A mushroom-shaped light guide for a circular dial of a control device is described, for example, in EP 1 083 090. In a mounted state, this light guide is not connected to the light source; therefore, since it is not integral with the axis of this source, it can be affected by misalignments therewith, with a resultant deterioration in the performance of the device.

Moreover, the device described in EP 1 083 090 appears to have little versatility; in particular, it is suitable only for situations in which the light source is arranged such that the axis thereof is concentric with the circular dial. In practice, this makes it necessary for there to be a light source for each circular dial, arranged concentrically therewith; this dictates an undesirable constraint at a design level.

It is therefore an object of the present invention to provide a light guide device which can solve at least one of the aforementioned problems.

This object is achieved according to the invention by a light guide device, comprising a light entrance part for receiving luminous radiation from a light source placed in front of it, and a light exit part configured for emitting said luminous radiation according to a distributed illumination pattern, wherein the aforementioned device includes
- a first light guide member comprising a central light transmitting portion, on an end of which said light entrance part is formed, and a support portion connected to the central light transmitting portion and arranged concentrically therewith, and
- a second light guide member comprising a shaft portion removably coupled to an end of the central light transmitting portion of the first light guide member, opposite to the light entrance part, and a light distributing portion connected to the shaft portion, on which said light exit part is formed.

In a device according to such a proposed solution, the first light guide member can be made integral, by means of the support portion thereof, with a support on which the light source is arranged; as a result, coaxial positioning in relation to the light source is ensured.

Moreover, since the parts are removably coupled, the first light guide member can be arranged in different angular positions about the longitudinal axis thereof, without changing the position of the second light guide member, so as to optimize the efficiency of the device and the directioning of the light beam.

Furthermore, the first light guide member can be coupled to second light guide members of differing shape in order to allow for adaptation to different installation conditions. In particular, the first light guide member can be coupled to a second light guide member which is configured for generating an asymmetrical illumination pattern, for example for illuminating two dials at the same time, in a situation in which the light source has to be arranged offset in relation to the dials.

Moreover, in particular installation situations, for example in light chambers of reduced dimensions, it is possible to use only the first light guide member.

The invention therefore also relates to a light guide member, comprising a light entrance part for receiving luminous radiation from a light source placed in front of it, and a light exit part configured for emitting said luminous radiation according to a distributed illumination pattern, and comprising a central light transmitting portion, on an end of which said light entrance part is formed, and a support portion connected to the central light transmitting portion and arranged concentrically therewith, wherein on the end of the central light transmitting portion opposite to the light entrance part said light exit part is formed as a light exit surface of convex, particularly conical shape.

Preferred embodiments of the invention are defined in the dependent claims, which are to be considered as an integral part of the present description.

Further characteristics and advantages of the device according to the invention will become clearer from the following detailed description of an embodiment of the invention, with reference to the attached drawings, which are provided purely by way of a non-limiting example and in which:

FIG. 1 is a simplified view of a number of components of an air-conditioning instrument panel for a dashboard of a motor vehicle.

Figure 1:
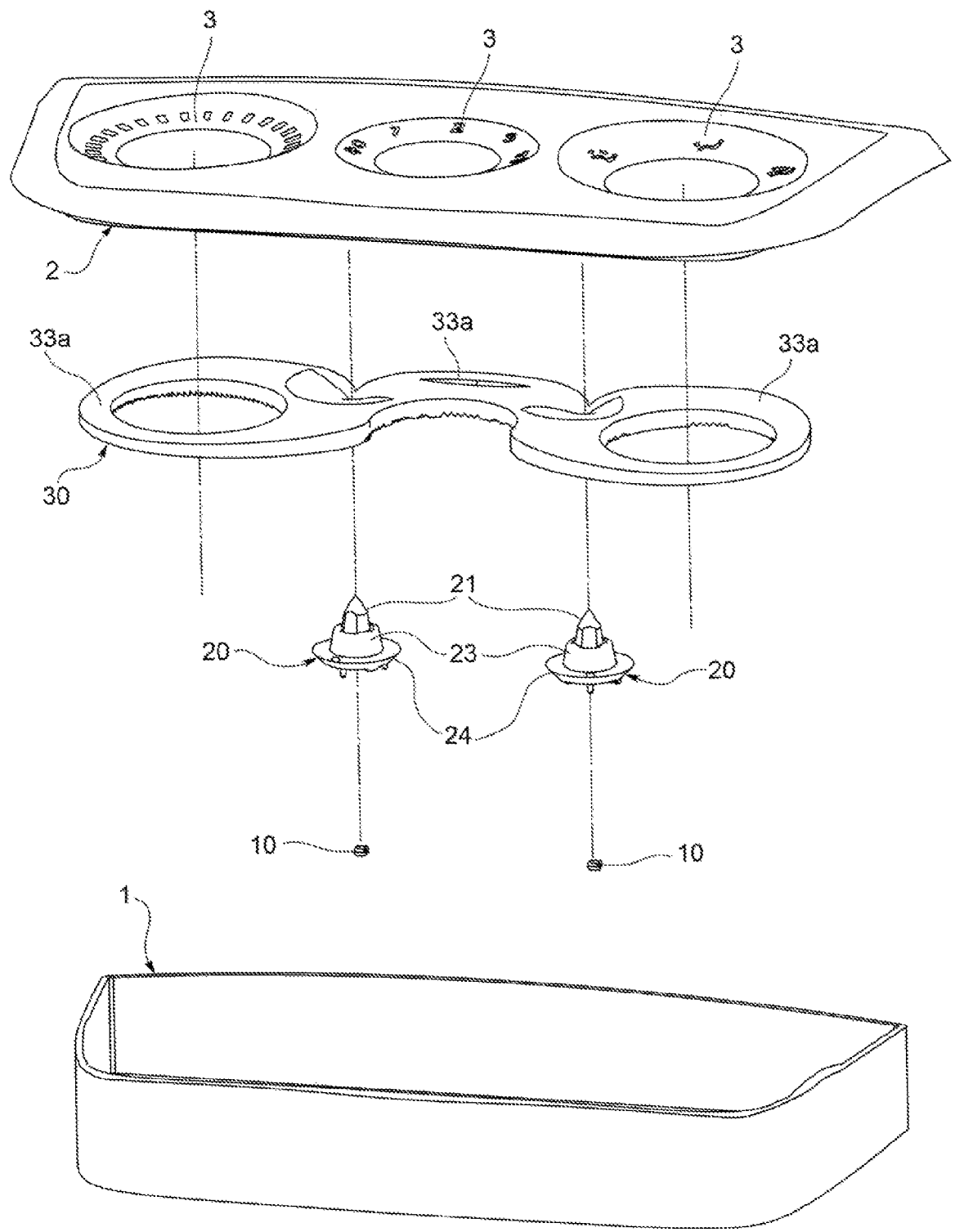
FIG. 1 is a simplified exploded view of a dial for an instrument panel of a motor vehicle.
Figure 2:
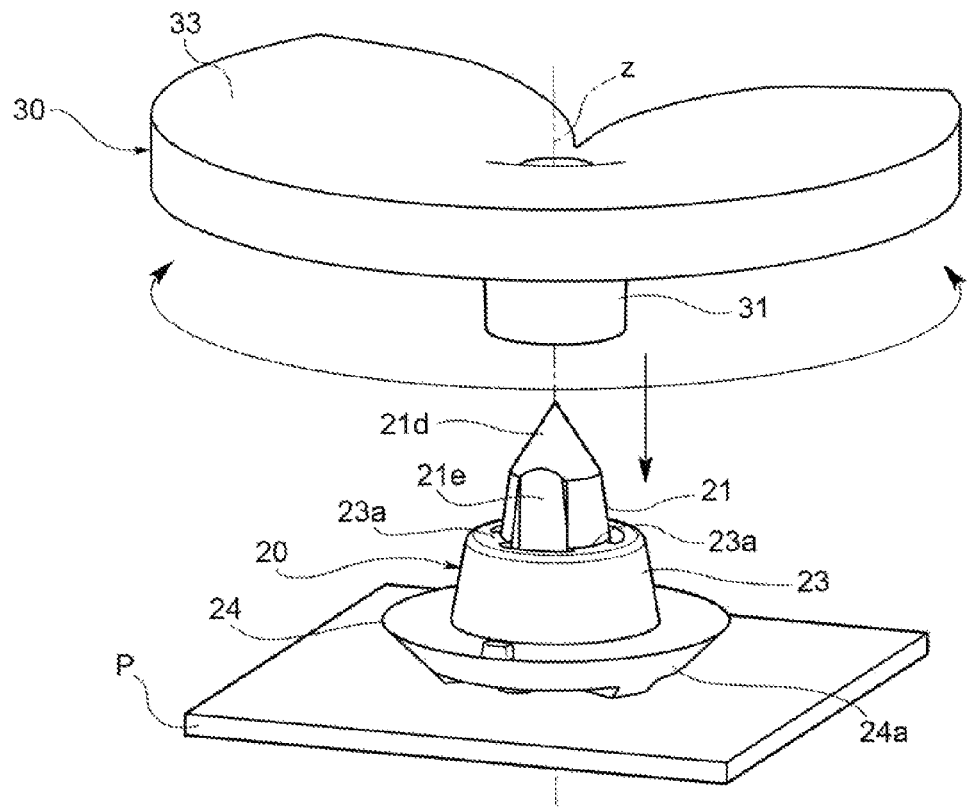
FIG. 2 is an exploded view of a part of a light guide device of the dial shown in FIG. 1.
Figure 3:
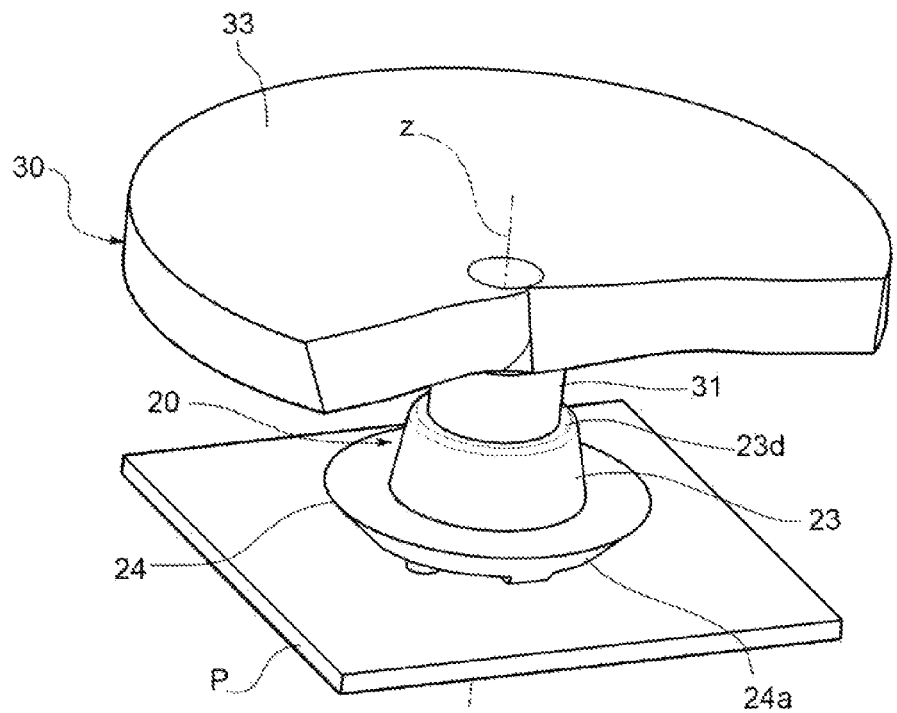
FIG. 3 is a perspective view of the guide device shown in FIG. 2.

The instrument panel in question comprises a case 1 having a cover 2 which bears a plurality of dial sections 3, which are retroilluminated by means of an illumination unit comprising one or more concentrated light sources 10, for example LEDs.

For diffusing the luminous radiation to the dial sections 3 according to a desired distributed illumination pattern, a light guide device comprising a first and a second, separate light guide member 20, 30 is associated with the light source(s). These first and second members 20, 30 are both monolithic parts which are made of transparent material, for example plastic material such as acrylic resin, and are formed for example by moulding.

As can be seen in FIG. 1, the number of first light guide members 20 is equal to the number of light sources 10 (two in the example), whereas there is just one second light guide member 30, this being shaped for distributing the luminous radiation coming from the sources to the dial sections 3, which differ in number to the light sources (three in the example). The light sources are arranged offset in relation to the circular scales of the dial sections. It goes without saying that that shown in FIG. 1 is merely an example, the invention not being limited to a particular number of light sources or sections to be illuminated, least of all to the specific application (air-conditioning control panel) described above.

Figure 4:
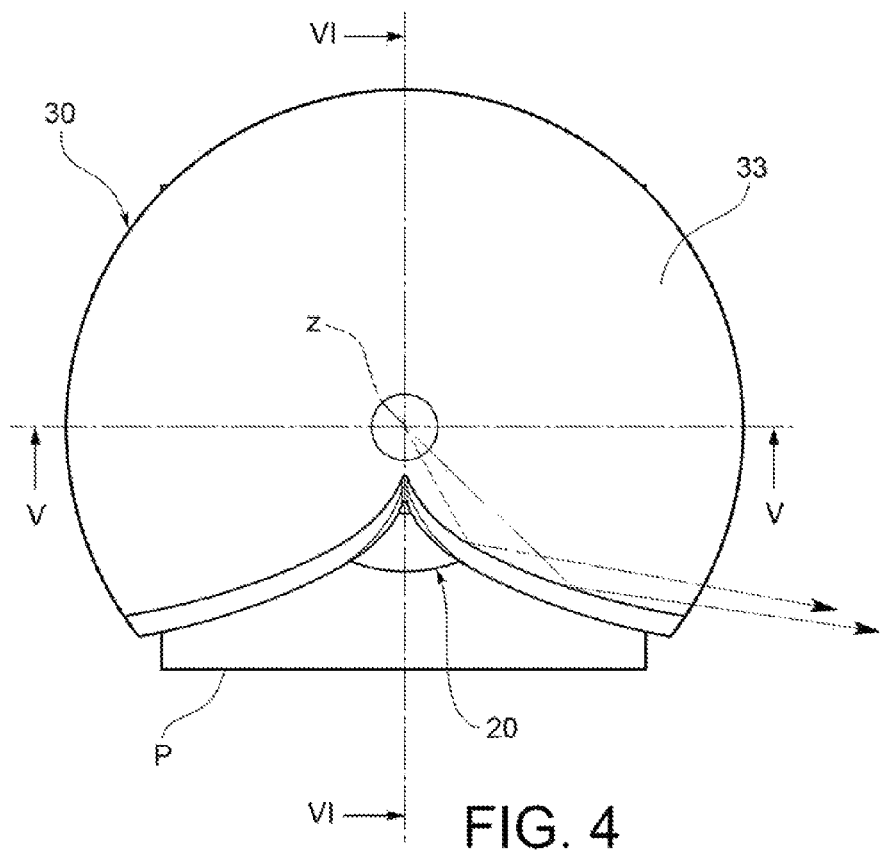
FIG. 4 is a plan view of the guide device shown in FIG. 2.
Figure 5:
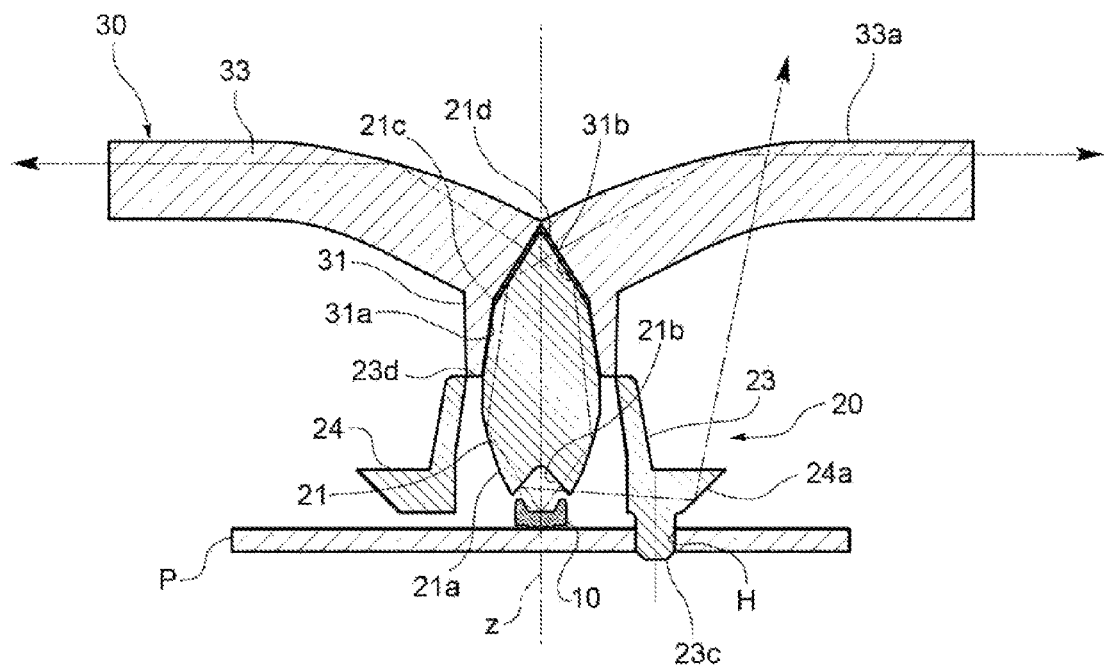
FIG. 5 is a cross-sectional view, viewed along the line V-V shown in FIG. 4.
Figure 6:
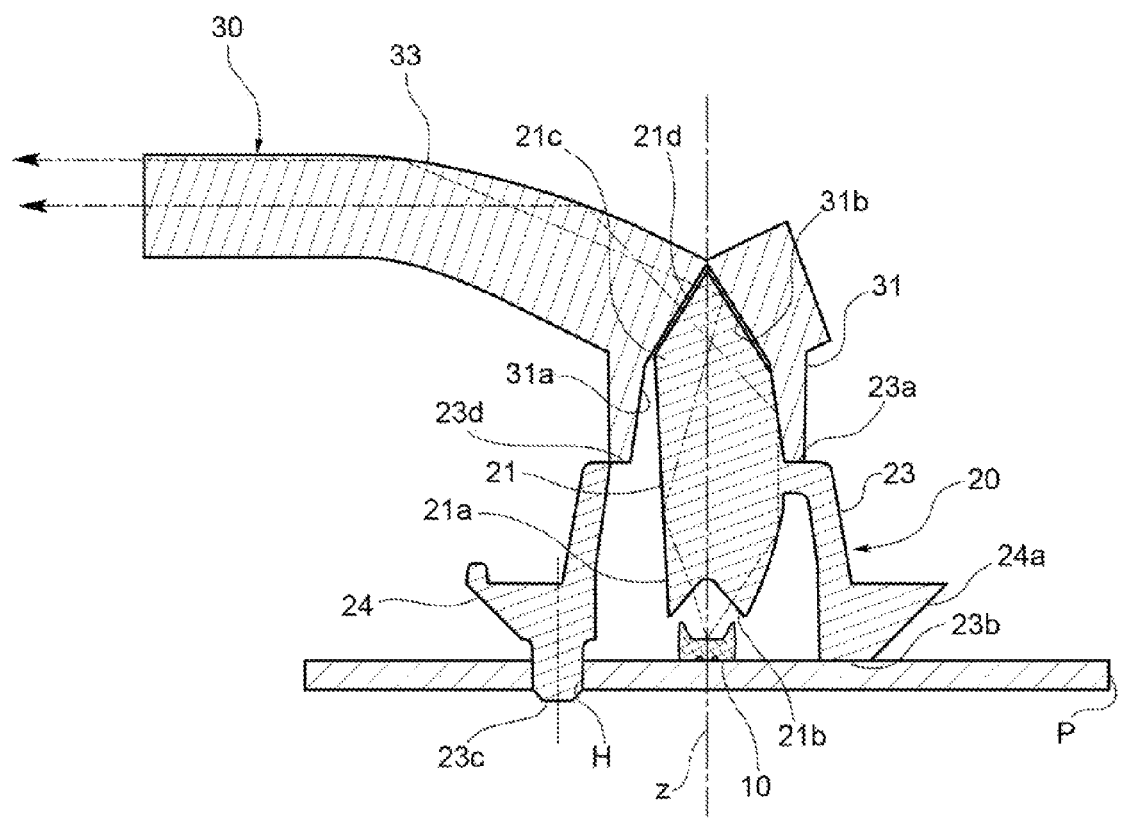
FIG. 6 is a cross-sectional view, viewed along the line VI-VI shown in FIG. 4.

FIGS. 2 to 6 show for simplicity a single first light guide member 20 and a cut portion of the second light guide member 30 thereabove. These figures moreover show a support P, for example a printed circuit board, which supports the light source 10 and has a circuit (not shown) for feeding electricity to the source. FIGS. 4 to 6 also depict a number of arrows showing the trajectories of the light rays emitted by the source 10, as set by the two light guide members 20 and 30.

The first light guide member 20 comprises a central light transmitting portion 21 and a support portion 23 connected to the central light transmitting portion 21 and arranged concentrically therewith. The function of the central light transmitting portion 21 is to transmit the majority of the radiation emitted by the light source, whereas the main function of the support portion 23 is that of connecting the central light transmitting portion 21 to the support P.

The central light transmitting portion 21 is shaped like a spindle and extends along a longitudinal axis z: It has a first end 21a, at which a light entrance part 21b for receiving luminous radiation from the light source 10 placed in front of it is formed. It is preferable that the light entrance part 21b consists of a recess of substantially conical shape formed on the first end 21a of the central light transmitting portion 21 of the first light guide member 20. The central light transmitting portion 21 moreover has a second end 21c, on the side opposite to the first end 21a on which the light entrance part 21b is formed. This second end 21c has an intermediate light exit surface 21d of convex, particularly conical shape. According to one embodiment of the invention (not shown), the central light transmitting portion 21 of the first light guide member 20 is circularly symmetric with respect to the longitudinal axis z. According to another embodiment, shown in the figures, the central light transmitting portion 21 of the first light guide member 20 is circularly symmetric with respect to the longitudinal axis z, except from a light directing longitudinal groove 21e laterally formed on its surface. The longitudinal groove 21e makes it possible to provide the light beam exiting the intermediate light exit surface 21d with an angular orientation predominantly in the radial direction on the side on which the longitudinal groove 21e is positioned.

The support portion 23 of the first light guide member 20 is shaped like a journal and is connected to the central light transmitting portion 21 by means of radial links 23a formed in one piece with the support portion 23 and the light transmitting portion 21.

The support portion 23 has a first end 23b, which in the mounted state is arranged in contact with the support P of the light source 10, and has a plurality of mounting studs 23c extending axially therefrom. These studs 23c can be inserted into corresponding holes H formed on the support P. It is preferable that the number of holes H is greater than the number of mounting studs 23c, and the holes are arranged in such a way as to allow the first light guide member 20 to be mounted in a selectively orientable manner in different angular positions about the longitudinal axis z. In this way, if the central light transmitting portion 21 has a circularly asymmetric shape, for example it is provided with the directing groove 21e, it is possible for the light beam to be angularly oriented depending on the angular position of the first light guide member 20.

As an alternative to the stud/hole connection, other connecting means interposed between the support P and the support portion 23 of the first light guide member 20 are available to a person skilled in the art, these likewise making it possible to define a plurality of different positions of angular orientation about the longitudinal axis z, in one of which the first light guide member 20 may be selectively positioned with respect to the support P.

As can be seen in FIGS. 5 and 6, the support portion 23 of the first light guide member 20 defines a chamber which, when mounted on the support P, encloses the light source 10, and moreover determines the positioning of the light transmitting portion 21 with respect to the light source 10.

It is preferable that a flange portion 24 is integrally formed about the support portion 23 of the first light guide member 20, an annular reflecting surface 24a being present on said flange portion for forwardly reflecting marginal rays coming from the light source 10 which are not intercepted by the light entrance part 21b of the light transmitting portion 21.

The second light guide member 30 comprises a shaft portion 31 and a light distributing portion 33 connected to the shaft portion 31. The function of the shaft portion 31 is predominantly that of allowing for the connection between the second light guide member 30 and the first light guide member 20, whereas the function of the light distributing portion 33 is that of receiving the luminous radiation coming from the central light transmitting portion 21 of the first light guide member 20 and of distributing it according to a desired illumination pattern.

The shaft portion 31 of the second light guide member 30 can be removably coupled to the second end 21d of the central light transmitting portion 21 of the first light guide member 20. In particular, this coupling makes it possible to rotate the two parts 20, 21 in relation to one another about the axis z. To this end, at one of its free ends the shaft portion 31 preferably has a cavity 31a, within which the second end 21c of the central light transmitting portion 21 of the first light guide member 20, opposite to the light entrance part 21b, can be inserted. It is preferable that an intermediate light entrance surface 31b is formed within this cavity 31a, it being possible for said surface to be coupled to the intermediate light exit surface 21d of the central light transmitting portion 21. The intermediate light entrance surface 31a is of conical shape corresponding to the shape of the intermediate light exit surface 21d of the central light transmitting portion 21, so as to allow for an optimum transmission of the light at the interface between the two surfaces as well as correct mutual positioning of the two parts 20 and 30 of the light guide device.

As can be seen in FIGS. 5 and 6, the free end of the shaft portion 31 of the second light guide member 30, when mounted on the first light guide member 20, abuts on a shoulder surface formed on a second end 23d of the support portion 23 of the first light guide member 20. Although this arrangement is advantageous in the embodiment described here, it is not necessary for the second light guide member 30 to always rest on the shoulder surface 23d, it being possible for the second light guide member 30 to be supported by other means and for the first light guide member 20 to act merely for centring and as a reference for the second light guide member 30.

The light distributing portion 33 has a light exit part 33a which is formed thereon and is configured for emitting the luminous radiation according to a distributed illumination pattern determined in accordance with the application requirements of the light guide device according to the invention. The light exit part can be positioned, for example, on a front face of the light distributing portion 33, on the side opposite to the light source 10, and/or on an edge of the light distributing portion 33, and can have reflecting surfaces, prism configurations, lenses and other optical devices for distributing the luminous radiation according to the desired pattern.

The invention claimed is:

1. A light guide device, comprising:
a light entrance part for receiving luminous radiation from a light source placed in front of it, and a light exit part configured for emitting said luminous radiation according to a distributed illumination pattern, characterized by including a first light guide member comprising a central light transmitting portion, on an end of which said light entrance part is formed, and a support portion connected to the central light transmitting portion and arranged concentrically therewith, and
a second light guide member comprising a shaft portion removably coupled to an end of the central light transmitting portion of the first light guide member, opposite to the light entrance part, and a light distributing portion connected to the shaft portion, on which said light exit part is formed
wherein the central light transmitting portion of the first light guide member is circularly symmetric with respect to a longitudinal axis, except from a light directing groove laterally formed on a surface of the central light transmitting portion.

2. A device according to claim 1, wherein said shaft portion has a cavity, within which the end of the central light transmitting portion of the first light guide member, opposite to the light entrance part, is inserted.

3. A device according to claim 2, wherein the end of the central light transmitting portion of the first light guide member, opposite to the light entrance part, has an intermediate light exit surface of convex, particularly conical shape that is coupled to an intermediate light entrance surface of matching conical shape, formed within the cavity of the shaft portion of the second light guide member.

4. A device according to claim 1, wherein the central light transmitting portion of the first light guide member is circularly symmetric with respect to a longitudinal axis.

5. A device according to claim 1, wherein said light entrance part consists of a recess of substantially conical shape formed on an end of the central light transmitting portion of the first light guide member.

6. A device according to claim 1, wherein a reflecting surface is formed on said support portion for forwardly reflecting marginal rays emitted by the light source and not intercepted by the light entrance part.

7. An illumination unit comprising a support, at least one light source positioned on said support, and a light guide device according to claim 1, which is positioned on said support in such a way that the support portion of the first light guide member is abutted on the support, and that the light entrance part formed on the central light transmitting portion is placed in front of the light source.

8. A unit according to claim 7, wherein connecting means are interposed between the support and the support portion of the first light guide member, which define a plurality of different positions of angular orientation about a longitudinal axis, in one of which the first light guide member may be selectively positioned with respect to the support.

9. A light guide member, comprising a light entrance part for receiving luminous radiation from a light source placed in front of it, and a light exit part configured for emitting said luminous radiation according to a distributed illumination pattern, characterized by including a central light transmitting portion, on an end of which said light entrance part is formed, and a support portion connected to the central light transmitting portion and arranged concentrically therewith, wherein on the end of the central light transmitting portion opposite to the light entrance part said light exit part is formed as a light exit surface of convex shape wherein the central light transmitting portion is circularly symmetric with respect to a longitudinal axis, except from a light directing groove laterally formed on a surface of the central light transmitting portion.

10. A member according to claim 9, wherein the central light transmitting portion is circularly symmetric with respect to a longitudinal axis.

11. A member according to claim 9, wherein said light entrance part consists of a recess of substantially conical shape formed on an end of the central light transmitting portion.

12. A member according to claim 9, wherein a reflecting surface is formed on said support portion for forwardly reflecting marginal rays emitted by the light source and not intercepted by the light entrance part.

13. An illumination unit comprising
a support,
at least one light source positioned on said support, and
a light guide member comprising a light entrance part for receiving luminous radiation from a light source, and a light exit part configured for emitting said luminous radiation according to a distributed illumination pattern, said light guide member comprising a central light transmitting portion, on an end of which said light entrance part is formed, and a support portion connected to the central light transmitting portion and arranged concentrically therewith,
wherein the light guide member is positioned on said support in such a way that the support portion of the light guide member is abutted on the support, and that the light entrance part formed on the central light transmitting portion is placed in front of the light source,
wherein the central light transmitting portion of the light guide member is circularly symmetric with respect to a longitudinal axis, except from a light directing groove laterally formed on a surface of the central light transmitting portion, and
wherein connecting elements are interposed between the support and the support portion of the light guide member, which define at least one position of angular orientation about a longitudinal axis, in which the light guide member is positioned with respect to the support.

14. A unit according to claim 13, wherein said connecting elements define a plurality of different positions of angular orientation about the longitudinal axis, in one of which the first light guide member may be selectively positioned with respect to the support.

15. A unit according to claim 13, wherein on the end of the central light transmitting portion opposite to the light entrance part said light exit part is formed as a light exit surface of convex shape.

16. A unit according to claim 13, wherein said light entrance part consists of a recess of substantially conical shape formed on an end of the central light transmitting portion.

17. A unit according to claim 13, wherein a reflecting surface is formed on said support portion for forwardly reflecting marginal rays emitted by the light source and not intercepted by the light entrance part.

18. A unit according to claim 13,
further including a second light guide member comprising a shaft portion removably coupled to an end of the central light transmitting portion of the first light guide member, opposite to the light entrance part, and a light distributing portion connected to the shaft portion, on which said light exit part is formed.

* * * * *